(No Model.)
S. RUSSELL.
SECONDARY BATTERY.
No. 383,150. Patented May 22, 1888.
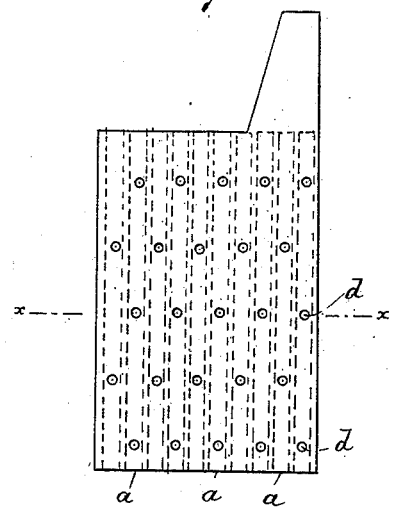
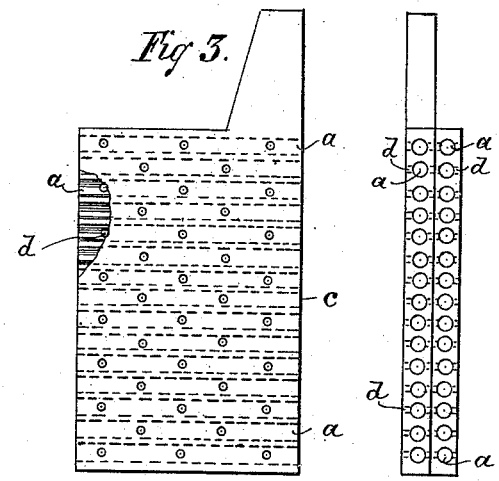
Witnesses:
Inventor:
Samuel Russell

UNITED STATES PATENT OFFICE.

SAMUEL RUSSELL, OF BROOKLYN, NEW YORK, ASSIGNOR TO THE CENTRAL ELECTRICAL COMPANY, OF NEW YORK.

SECONDARY BATTERY.

SPECIFICATION forming part of Letters Patent No. 383,150, dated May 22, 1888.

Application filed September 5, 1887. Serial No. 248,772. (No model.)

*To all whom it may concern:*

Be it known that I, SAMUEL RUSSELL, a citizen of the United States, residing in Brooklyn, Kings county, State of New York, have invented certain new and useful Improvements in Secondary Batteries, of which the following is a description in such full, clear, concise, and exact terms as to enable any one skilled in the arts to which it pertains or with which it is most nearly connected to make and use the same, reference being had to the accompanying drawings, making part of this specification, and to the figures and letters of reference marked thereon, similar letters of reference indicating the same parts in the different figures of the drawings.

My invention consists of an improved "element" to be used in the construction of secondary batteries.

In the drawings, Figure 1 shows a side elevation of my said improved element; Fig. 2, a cross-section thereof on the line $x\ x$; Fig. 3, a side elevation having a section cut out of its side, and Fig. 4 a front elevation of two of said elements set side by side.

Secondary batteries are now so well known to those skilled in the art of applied electricity that no special description of a battery as a whole is thought necessary for a complete understanding of this improvement.

The invention consists of a battery element composed of lead or other suitable material, in the form of a plate, and having a series of holes or channels made in it on a plane parallel with its sides, as shown by the drawings. These holes or channels are shown in cross-section by $a\ a\ a$, Fig. 2, in front elevation by Fig. 4, and in dotted lines on a plane parallel with the sides of the plate. In Figs. 1 and 3 these holes or channels are made in the plates for the purpose of receiving the oxide of lead or other active material used in constructing the battery, the electrolytic fluid having access to the oxide at the end of the said longitudinal holes, and also through the transverse holes $d\ d\ d$ made in the sides of the plates. These holes need not be exactly parallel with the sides of the plate, but should be as nearly so as convenient to make them. In constructing the battery these plates should be set side by side, as shown by Fig. 4, but not so close as to prevent access of the electrolytic fluid to their surfaces and through the holes in the plates to the oxide. Elements made as described make very effective electrodes and retain their original form better than any other of which I have any knowledge.

It will be observed that in the elements illustrated in the drawings the external and opposing surfaces of the several plates are parallel to each other throughout their entire length, and that therefore the electric current will, practically speaking, meet the same resistance in passing from every point on the side of one plate to the nearest point on the opposite plate. By these means local action destructive to the battery will be avoided.

It will also be observed that in the elements herein described the use of solder is rendered unnecessary, as my plates are made of one piece complete, including the leading-in conductor where subjected to the action of the electrolytic fluid, thereby avoiding the use of a frame and decreasing the weight of the element.

The features of novelty are designated by the following claims:

1. In a secondary battery, the combination of a plurality of plates having parallel opposing sides, and each having holes made through its body on a plane parallel with its sides and filled with active material or with material to become active, substantially as described.

2. In a secondary battery, the combination of a plurality of plates having parallel sides, each having holes made through its body on a plane parallel with its sides and filled with active material or material to become active, and also having transverse holes entering from the side of the plates to the longitudinal holes containing said material, substantially as described.

3. A secondary-battery element composed of a single continuous metallic plate provided with a series of holes through its body parallel with its sides, substantially as described.

SAMUEL RUSSELL.

Witnesses:
WM. H. BROADNAX,
AMOS BROADNAX.